(12) United States Patent
McIlroy et al.

(10) Patent No.: US 8,814,984 B2
(45) Date of Patent: Aug. 26, 2014

(54) PROCESS AND APPARATUS FOR REMOVING CONTAMINANTS FROM A GAS STREAM

(75) Inventors: Christopher B. McIlroy, Park Ridge, IL (US); John R. Harness, Elgin, IL (US); Nagaraju Palla, Woodridge, IL (US); Ronald K. Subris, Chicago, IL (US); Stephen J. Van Dyke, Hawthorn Woods, IL (US)

(73) Assignee: UOP LLC, Des Plaines, IL (US)

( * ) Notice: Subject to any disclaimer, the term of this patent is extended or adjusted under 35 U.S.C. 154(b) by 231 days.

(21) Appl. No.: 13/467,637

(22) Filed: May 9, 2012

(65) Prior Publication Data
US 2013/0298765 A1 Nov. 14, 2013

(51) Int. Cl.
*B01D 59/12* (2006.01)

(52) U.S. Cl.
USPC ............ 95/51; 55/482; 95/43; 95/45; 95/136; 96/4

(58) Field of Classification Search
CPC . Y02C 10/10; B01D 53/228; B01D 2257/504
USPC .................. 55/482; 95/43, 45, 51, 136; 96/4
See application file for complete search history.

(56) References Cited

U.S. PATENT DOCUMENTS

| | | | |
|---|---|---|---|
| 3,735,600 A * | 5/1973 | Dowdell et al. ................ 62/619 | |
| 4,751,104 A | 6/1988 | Kulprathipanja et al. | |
| 4,781,907 A * | 11/1988 | McNeill ........................ 423/351 | |
| 5,407,466 A * | 4/1995 | Lokhandwala et al. .......... 95/49 | |
| 5,702,503 A | 12/1997 | Tse Tang | |
| 6,368,382 B1 | 4/2002 | Chiou | |
| 7,041,271 B2 * | 5/2006 | Drnevich et al. ........... 423/648.1 | |
| 7,507,274 B2 * | 3/2009 | Tonkovich et al. ............. 95/106 | |
| 7,575,624 B2 | 8/2009 | Cartwright et al. | |
| 7,731,779 B2 * | 6/2010 | Palumbo .......................... 95/52 | |
| 7,998,246 B2 | 8/2011 | Liu et al. | |
| 8,127,937 B2 | 3/2012 | Liu et al. | |
| 8,277,932 B2 * | 10/2012 | Ho ................ 428/221 | |
| 2003/0182861 A1 * | 10/2003 | Weimer et al. ............. 48/197 R | |
| 2004/0073076 A1 * | 4/2004 | Drnevich et al. ............. 585/809 | |
| 2005/0217479 A1 * | 10/2005 | Hale et al. ........................ 95/53 | |
| 2006/0140852 A1 * | 6/2006 | Russell et al. ................ 423/652 | |
| 2006/0239874 A1 * | 10/2006 | Gobina et al. ................ 422/192 | |
| 2008/0168900 A1 * | 7/2008 | Ho .................................... 95/48 | |
| 2009/0013870 A1 * | 1/2009 | Sorensen et al. .................. 95/96 | |
| 2011/0094378 A1 | 4/2011 | Mitariten | |

(Continued)

OTHER PUBLICATIONS

Meche, Modec, Inc., has commissioned a UOP Separex membrane system for processing natural gas on a new floating production, storage and offloading (FPSO) vessel. Hydrocarbon Processing, v 91, n 1, Jan. 2012.

(Continued)

*Primary Examiner* — Jason M Greene
*Assistant Examiner* — Anthony Shumate
(74) *Attorney, Agent, or Firm* — Mark Goldberg

(57) ABSTRACT

A gas purification process for treating a gas stream includes supplying the gas stream to at least one membrane unit to produce a permeate stream and a retentate stream. The retentate stream contains a lower concentration of at least one of water, hydrogen sulfide, or carbon dioxide as compared to the gas stream. The retentate stream is supplied to a molecular sieve unit to remove hydrogen sulfide to produce a treated gas product stream.

19 Claims, 2 Drawing Sheets

(56) References Cited

U.S. PATENT DOCUMENTS

| | | | |
|---|---|---|---|
| 2011/0269906 A1* | 11/2011 | Ho | 525/57 |
| 2011/0290111 A1 | 12/2011 | Dunne et al. | |
| 2012/0000359 A1 | 1/2012 | Bresler et al. | |
| 2012/0222555 A1* | 9/2012 | Gupta et al. | 95/136 |

OTHER PUBLICATIONS

Gritsenko et al., Membrane technology of purification and separation of hydrocarbon gases, International LNG/LPG Conference (Amsterdam, The Netherlands Dec. 4-7, 1990) Preprints N.7.4 V7 (1990) 8P, Dec. 4, 1990, 8 pages.

* cited by examiner

PROCESS AND APPARATUS FOR REMOVING CONTAMINANTS FROM A GAS STREAM

FIELD OF THE INVENTION

This invention relates to a dry process for removing impurities from natural gas feeds. More particularly, this invention relates to a process for removal of contaminants including carbon dioxide, hydrogen sulfide, and water from natural gas using a two step process whereby gas is sent through a membrane unit and a molecular sieve unit.

BACKGROUND OF THE INVENTION

Floating Production Storage and Offloading (FPSO) ships contain processes designed to process hydrocarbon streams from subsea wells to produce oil. The oil is typically stored on the ship until it can be offloaded onto tankers and further processed on land. A byproduct of oil production is the formation of a natural gas, which can be treated to remove contaminants and produce treated natural gas that is utilized onshore in typical natural gas pipelines. Prior to entering the pipeline, however, the natural gas must be processed to meet the pipeline specifications. In particular, pipelines generally require a specific purity of the treated natural gas with respect to various contaminants including carbon dioxide, water, and sulfur so as to not damage the pipeline.

The use of solvent-based systems to remove contaminants from natural gas is well known and utilized in prior art systems. However, there are various drawbacks to solvent-based purification systems. In particular, solvent-based systems suffer from various operating concerns due to rocking motion on a floating vessel such as a ship, and the liquid nature of the solvent. The rocking motion inside the various operating units may result in low adsorption efficiency, which may be insufficient for the treated natural gas to meet the specifications for the pipeline. There are further concerns regarding health, safety, and the environment with the use of a liquid solvent on a floating vessel. Further, the operating units of solvent-based systems are typically larger and require more space, which is frequently limited by the vessel size. Additionally, solvent-based systems typically include more restrictive operating parameters because the solvent must be kept circulating though the system and the solvent flow rate is difficult to adjust.

This invention overcomes various problems associated with solvent-based systems, either on a vessel or on land. In particular, the process of the present invention allows for a membrane and molecular sieve treatment process that is not solvent-based. The process disclosed herein reduces the health, safety, and environmental concerns of a solvent-based system because of the absence of a toxic liquid solvent on an unstable vessel. Further, the dry process disclosed herein includes an increased purity of the treated natural gas due to the process functioning consistently independent of any rocking motion. The process further includes a compact, modular construction that allows for increased flexibility. Unlike the solvent-based systems that typically utilize larger unwieldy distillation columns, compact and modular construction of the components used in this process is possible because the membrane and sieve units may be built in groups in discrete sections and stacked in an efficient manner. Finally, operating efficiencies are realized because the modular components may be operated independently from one another, which allows the process to perform effectively throughout a large operating envelop including turndown conditions.

The process of the present invention is designed to produce a treated natural gas having the requisite purity to be sent through a pipeline. The process may take place on an ocean vessel, such as a ship, or a land based facility. The process includes a cleaning step having a membrane unit that can achieve the bulk removal of contaminants such as carbon dioxide, water, and hydrogen sulfide followed by a polishing step that includes a molecular sieve unit specially provided to minimize the hydrogen sulfide content of the treated natural gas. The removal of hydrogen sulfide from the treated natural gas is important to prevent corrosion in the pipeline.

SUMMARY OF THE INVENTION

According to one aspect of the invention, a gas purification process for treating a gas stream includes supplying the gas stream to at least one membrane unit to produce a permeate stream and a retentate stream. The retentate stream contains a lower concentration of at least one of water, hydrogen sulfide, or carbon dioxide as compared to the gas stream. The retentate stream is supplied to a molecular sieve unit to remove hydrogen sulfide to produce a treated gas product stream.

According to another aspect of the invention, a process for treating a natural gas stream to create a product gas stream comprises a first cleaning step including a membrane unit adapted to remove carbon dioxide, hydrogen sulfide, and water from the gas stream, and a second polishing step including a molecular sieve unit adapted to remove hydrogen sulfide from the gas stream. The process operates under dry conditions without a solvent.

According to a different aspect of the invention, an apparatus for treating a gas stream to create a treated product gas stream comprises a membrane unit adapted to remove carbon dioxide, hydrogen sulfide, and water from the gas stream and a molecular sieve unit fluidly connected to the membrane unit and adapted to remove hydrogen sulfide from the gas stream. The process operates under dry conditions without a solvent.

DETAILED DESCRIPTION OF THE DRAWINGS

Figure 1:
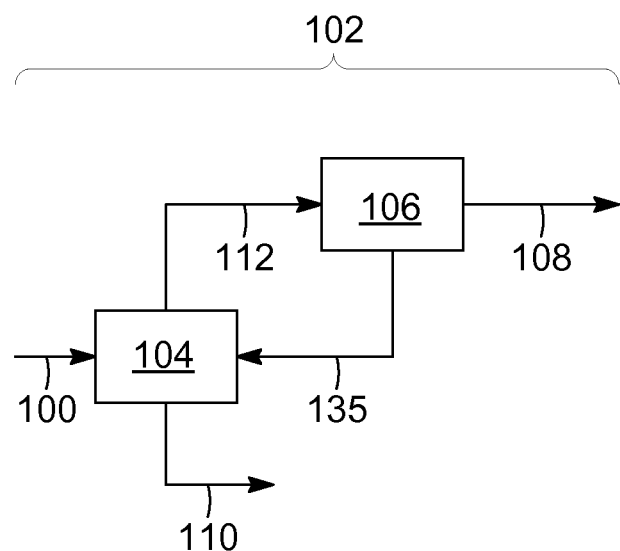
FIG. 1 is a diagrammatic view of the process used to treat gas in accordance with the disclosure herein comprising a first cleaning step and a second polishing step.
Figure 2:
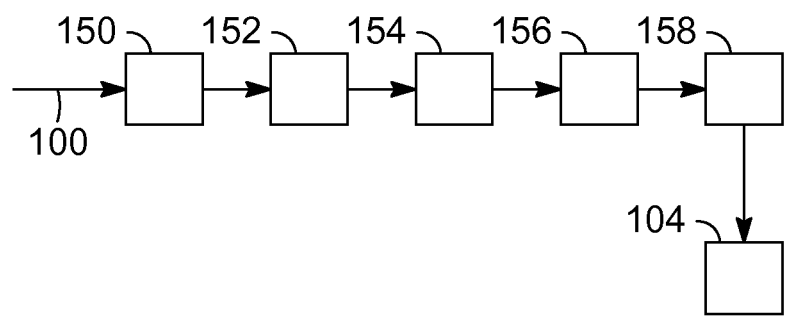
FIG. 2 is a diagrammatic view of the first cleaning step of the process shown in FIG. 1.
Figure 3:
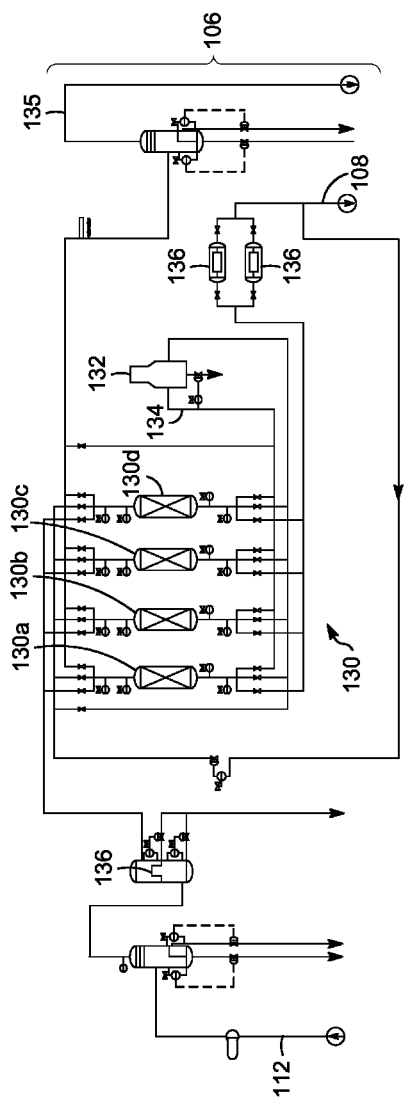
FIG. 3 is a diagrammatic view of the second polishing step of the process shown in FIG. 1.

FIGS. 1-3 depict the steps of a process for treating a gas stream in accordance with the present invention. The gas stream may be any stream comprising various hydrocarbons and/or impurities, and more specifically, it is contemplated that the gas stream is a natural gas stream. Natural gas is a hydrocarbon mixture that primarily comprises methane. Natural gas typically further includes other hydrocarbons, water, and/or other contaminants such as carbon dioxide ($CO_2$) and hydrogen sulfide ($H_2S$) in varying amounts. One exemplary natural gas stream 100 comprises methane in an amount of about 80% mol, ethane in an amount of about 12% mol, nitrogen in an amount of about 0.4% mol, other hydrocarbons in an amount of about 7% mol, carbon dioxide in an amount of about 0.5% mol to about 80% mol, hydrogen sulfide of between about 100 ppmv to about 10,000 ppmv, and saturated water. It should be understood that the natural gas feed may include additional components in varying amounts as known in the art. Natural gas for use in a pipeline must be treated to meet the pipeline specification, which typically requires the removal of contaminants so that the natural gas has a specified purity. Alternatively, the natural gas feed may also be liquefied, which further requires a more stringent purity of the natural gas feed.

As seen in FIG. 1, the natural gas stream 100 is sent through a gas purification process 102 having a membrane unit 104 in fluid communication with a molecular sieve unit 106. The resultant gas that exits the gas purification process 102 is a treated product gas stream 108 having purity at least sufficient for use in a typical pipeline (not shown). The membrane unit 104 is provided as a first cleaning step in the gas purification process 102 and the molecular sieve unit 106 is provided as a second polishing step. The process 102 is a dry process, whereby both the membrane unit 104 and the molecular sieve unit 106 operate under dry conditions such that the gas purification process 102 does not include any solvent-based steps (i.e., liquid contacting steps).

The first cleaning step in the gas purification process 102 includes sending the natural gas stream 100 through the membrane unit 104 and expelling a permeate stream 110 and a retentate stream 112. The membrane unit 104 is primarily adapted to remove carbon dioxide from the natural gas stream 100 and simultaneously dehydrate the natural gas stream 100 to pipeline specifications. Although other contaminants are removed in the first cleaning step (i.e., hydrogen sulfide), such removal is generally not sufficient such that the treated product gas stream 108 may be used in a pipeline or liquefied. Depending on the purity required of the treated product gas stream 108, one or more stages may be used in the membrane unit 104. In one embodiment, the membrane unit 104 comprises a single stage membrane unit. In a different embodiment, the membrane unit 104 comprises a multiple stage membrane unit. The selection of a single stage or multiple stage membrane unit is dependent upon the exact level of purification desired for the treated product gas stream 108.

One membrane unit 104 suitable for use in the purification process 102 is a SEPAREX® membrane manufactured by UOP (Des Plaines, Ill.). The SEPAREX membrane works according to a solution-diffusion process, whereby components dissolve into the membrane surface and diffuse through it. More soluble components permeate faster. Membranes for use in the purification process 102 typically are characterized by permeability and selectivity.

Various operating parameters relating to the natural gas stream 100 may be adjusted according to the desired purity and in relation to the specific membrane unit 104 being utilized. In particular, the natural gas stream 100 is typically sent through the membrane(s) at a high pressure. A suitable pressure of the natural gas stream 100 as it enters the membrane 104 is generally between about 300 psiA to about 1500 psiA and more preferably about 500 psiA to about 1200 psiA. It is understood that the pressure of the natural gas stream 100 may be adjusted as known in the art. The natural gas stream 100 typically enters the membrane 104 at a flow rate of between about 5 MMSCFD to about 500 MMSCFD or higher. The natural gas stream 100 enters the membrane unit 104 at a temperature of about −10° C. to about 90° C., more preferably about 20° C. to about 60° C., and most preferably about 35° C.

The membrane includes one or more stages and may comprise various materials including cellulose acetate, polyimide, polyamide, polysulfone, silicone, and the like. The membrane(s) may be either asymmetric and/or composite. Asymmetric membranes generally comprise a single polymer having a thin selective layer and a porous support layer. Composite membranes generally comprise two or more polymers having a layer of a highly optimized polymer that is mounted on an asymmetrical structure. The membrane(s) may also be spiral-would or hollow fiber.

Suitable membranes for use in the gas purification process 102 are described in U.S. Pat. Nos. 4,751,104; 5,702,503; 6,368,382; 8,127,937; and 7,998,246, the disclosures of which are hereby incorporated by reference. However, it should be apparent that other membranes may be used in the gas purification process 102 as known in the art.

After the natural gas stream 100 passes through the membrane unit 104, two gas streams, the permeate stream 110 and the retentate stream 112, exit the membrane unit 104. The permeate stream 110 includes methane and a higher concentration of impurities such as hydrogen sulfide, carbon dioxide, and water. A typical permeate stream 110 includes about 75% of carbon dioxide, about 0.5% of water, about 5% of hydrogen sulfide, and the balance hydrocarbons. The permeate stream 110 typically exits the membrane unit 104 at a pressure of less than about 100 psiA, more preferably less than about 75 psiA, and most preferably less than about 40 psiA. The change in pressure between the natural gas stream 100 and the permeate stream 110 is between about 300 psi to about 1,500 psi and more preferably about 600 psi to about 1,200 psi. The permeate stream 110 may be flared, incinerated, and/or re-injected into the purification process 102.

The retentate stream 112 also includes methane, but the retentate stream 112 includes a lower concentration of contaminants such as carbon dioxide and hydrogen sulfide as compared to the permeate stream 110. A typical retentate stream 112 includes about 3% of carbon dioxide, about 50 ppmv of water, about 1000 ppmv of hydrogen sulfide, and the balance hydrocarbons. Carbon dioxide is typically present in the retentate stream 112 in an amount of less than about 10 mole %, more preferably in an amount less than about 5 mole %, and most preferably less than about 3 mole %. Hydrogen sulfide is typically present in the retentate stream 112 in an amount of less than about 2000 ppmv, more preferably in amount less than about 1500 ppmv, and most preferably less than about 1000 ppmv. The membrane unit 104 also reduces the water content of the natural gas stream 100 such that the retentate stream 112 includes a water concentration that is typically less than about 7 lb/MMSCF.

After exiting the membrane unit 104, the retentate stream 112 is sent through the molecular sieve unit 106 for the second polishing step to remove remaining contaminants. The molecular sieve unit 106 includes at least one molecular sieve adsorber vessel 130. The vessel 130 includes an adsorbent material such as zeolite and/or alumina that adsorbs impurities from the retentate stream 112. One suitable adsorbent material is RK-38 made by UOP (Des Plaines, Ill.), which is typically provided as a 0.16 cm diameter pellet. The adsorbent material may be naturally occurring or synthetically produced. Other adsorbent materials may be used as well, but adsorbent materials specifically designed to remove sulfur are particularly preferred.

As shown in FIG. 3, the molecular sieve unit 106 may include a plurality of adsorber vessels 130a, 130b, 130c, and 130d fluidly connected to each other. The vessels 130a-130d operate in a series of adsorption and regeneration steps. During adsorption impurities are adsorbed as the retentate stream 112 passes through the vessels 130a-130d. Temperature and/or other operating parameters of the vessels 130a-130d are selected based on the purity desired and the contaminants that are to be removed from the retentate stream 112.

One contaminant preferably removed in the molecular sieve unit 106 includes hydrogen sulfide. In particular, hydrogen sulfide is reduced to less than about 15 ppmv, more preferably less than about 10 ppmv, and most preferably less than about 4 ppmv. The molecular sieve unit 106 may remove other contaminants, but the parameters of the molecular sieve unit 106 are specifically adjusted to primarily remove hydrogen sulfide from the retentate stream 112.

One molecular sieve adsorbent material suitable for use in the molecular sieve unit 106 in the gas purification process 102 is any molecular sieve adsorbent material developed by UOP (Des Plaines, Ill.). The molecular sieve adsorbent materials are synthetically produced crystalline metal aluminosilicates that have been activated for adsorption by removing their water of hydration. Appropriate operating conditions may be selected for the molecular sieve unit 106 that include the number of vessels, the vessel diameter and height, pore size of the adsorbent, quantity and type of adsorbent, layer thickness of the adsorbent, temperature in the vessel(s), the type of cycle, the pressure drop between vessels, and time the gas spends in each vessel. The molecular sieve unit 106 preferably includes specific operating parameters selected to remove hydrogen sulfide. The pore size of the molecular sieve adsorbent material is important and should be selected so that the molecular sieve unit 106 readily adsorbs hydrogen sulfide. Suitable pore size of the adsorbent within the molecular sieve unit 106 is between about 4 angstroms and about 10 angstroms, more preferably between about 4 angstroms and about 6 angstroms, and most preferably about 5 angstroms. It should be apparent that other molecular sieve units 106 may be suitable for use in the present invention as well.

The molecular sieve unit 106 may include other components useful to assist in the polishing step. For example, a regeneration gas heater 132 is provided that utilizes a portion of the treated product steam 108 to produce a regeneration gas 134 that is used to regenerate the adsorbent. The regeneration gas 134 typically has a temperature of between about 200° C. and about 400° C., and more preferably about 300° C. Spent regeneration gas 135 containing the desorbed contaminants, is cooled and recycled back through the membrane unit 104 to improve the hydrocarbon recovery of the system. Filters 136 and/or other components known in the art may also be used in conjunction with the molecular sieve unit 106.

The regeneration gas 134, which is a slip stream of the treated gas 108 may be used to regenerate the adsorbent with the cooled spent regeneration gas 135 recycled back to the membrane unit 104 and/or may be disposed of in manners known in the art. The regeneration gas 134 typically comprises about 25% of the treated product gas stream 108 from the molecular sieve unit 106.

The treated product gas stream 108 preferably meets typical pipeline specifications after leaving the molecular sieve unit 106. The treated product gas stream 108 may be sent through a pipeline and/or liquefied. It should be recognized that the treated product gas stream 108 will require a lower concentration of contaminants as compared to the pipeline specifications if it is to be liquefied. The treated product gas stream 108 preferably includes a carbon dioxide concentration of less than 3% mol, a hydrogen sulfide concentration of less than 4 ppmv, and a water concentration of less than 150 ppmv.

It should be recognized that various steps may be added to the gas purification process 102 that assist in purifying and/or preparing the natural gas stream 100 to flow through the process 102. As shown in FIG. 2, the gas purification process 102 may further involve pretreatment steps including sending the natural gas stream 100 through any of a filter coalescer 150, a preheater 152, a guard bed 154, a particle filter 156, a separator unit 158 and/or various other pre-treatment units as known in the art. All of the pre-treatment units are optionally provided before the membrane unit 104 and are adapted to remove the more easily separable feed contaminants such as lube oil and corrosion inhibitors. The separator unit 158 may be provided to separate contaminants that are not separated in the other pre-treatment steps. For example, the separator unit 158 condenses and separates water and heavy hydrocarbon tails from the gas stream. The separator unit 158 preferably utilizes a low temperature separation process that uses supersonic gas velocities. The separator unit 158 may further be optimized by using cold gas that exits the separator unit 158 in conjunction with air, water, or seawater if further cooling is desired. The separator unit 158 typically includes a gas velocity at the throat of the inlet nozzle around Mach 1, which fixes the flow through the tube. One suitable separator unit 158 is the TWISTER™ separator manufactured by Twister B V (Rijswijk, Netherlands).

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A gas purification process for treating a gas stream comprising:
   supplying the gas stream to at least one membrane unit to produce a permeate stream and a retentate stream, wherein the retentate stream contains a lower concentration of at least one of water, hydrogen sulfide, or carbon dioxide as compared to the gas stream; and
   supplying the retentate stream to a molecular sieve unit to remove hydrogen sulfide to produce a treated gas product stream;
   wherein the change in pressure between the gas stream and the permeate stream is between about 300 psi to about 1,500 psi.

2. The process of claim 1, wherein the at least one membrane unit is primarily provided to remove carbon dioxide from the gas stream while simultaneously dehydrating the gas stream and removing at least a portion of the hydrogen sulfide.

3. The process of claim 1, wherein a multiple stage membrane unit is used.

4. The process of claim 1, wherein the permeate stream exits the at least one membrane unit at a pressure less than about 40 psiA.

5. The process of claim 1, wherein the retentate stream includes a carbon dioxide concentration of less than about 3 mole %.

6. The process of claim 1, wherein the retentate stream includes a hydrogen sulfide concentration of between about 20 ppmv to about 1000 ppmv.

7. The process of claim 1, wherein the water concentration of the gas stream is reduced to less than about 7 lb/MMSCF after passing through the at least one membrane unit.

8. The process of claim 1, wherein the molecular sieve unit comprises at least one molecular sieve adsorber vessel.

9. The process of claim 8, wherein the at least one molecular sieve adsorber vessel includes an adsorbent material.

10. The process of claim 1 further including the step of recycling a regeneration gas stream from the molecular sieve unit back to the at least one membrane unit, wherein the regeneration gas stream includes a hydrogen sulfide concentration of about 0.1 mol% to about 1 mol%.

11. The process of claim 1, wherein the process is substantially dry such that the membrane unit and the molecular sieve do not utilize any solvents.

12. An apparatus for treating a gas stream to create a treated product gas stream, comprising:
   a membrane unit adapted to remove carbon dioxide, hydrogen sulfide, and water from the gas stream;
   a molecular sieve unit fluidly connected to the membrane unit and adapted to remove hydrogen sulfide from the gas stream, wherein the apparatus operates under dry conditions without a solvent; and
   a regeneration gas heater provided to utilize a portion of the treated product gas to produce a regeneration gas that is used to regenerate the adsorbent wherein the treated product gas stream includes a hydrogen sulfide concentration less than about 4 ppmv.

13. A gas purification process for treating a gas stream comprising:
   supplying the gas stream to at least one membrane unit to produce a permeate stream and a retentate stream, wherein the retentate stream contains a lower concentration of at least one of water, hydrogen sulfide, or carbon dioxide as compared to the gas stream;
   supplying the retentate stream to a molecular sieve unit to remove hydrogen sulfide to produce a treated gas product stream; and
   recycling a regeneration gas stream from the molecular sieve unit back to the at least one membrane unit, wherein the regeneration gas stream includes a hydrogen sulfide concentration of about 0.1 mol% to about 1 mol%.

14. The process of claim 13, wherein the at least one membrane unit is primarily provided to remove carbon dioxide from the gas stream while simultaneously dehydrating the gas stream and removing at least a portion of the hydrogen sulfide.

15. The process of claim 13, wherein a multiple stage membrane unit is used.

16. The process of claim 13, wherein the retentate stream includes a carbon dioxide concentration of less than about 3 mole %.

17. The process of claim 13, wherein the retentate stream includes a hydrogen sulfide concentration of between about 20 ppmv to about 1000 ppmv.

18. The process of claim 13, wherein the water concentration of the gas stream is reduced to less than about 7 lb/MMSCF after passing through the at least one membrane unit.

19. The process of claim 13, wherein the process is substantially dry such that the membrane unit and the molecular sieve do not utilize any solvents.

\* \* \* \* \*